Patented June 5, 1923.

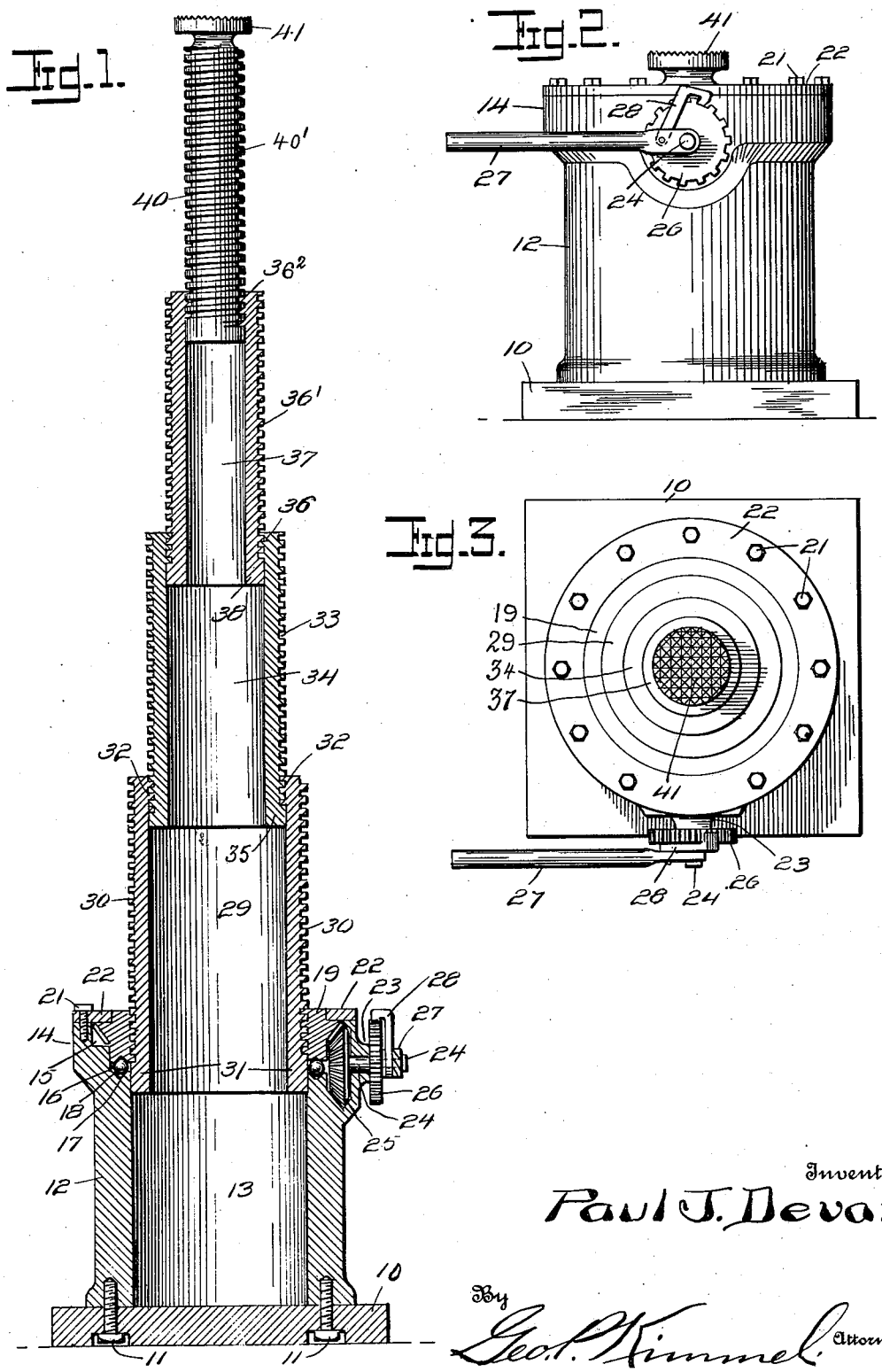

1,457,825

UNITED STATES PATENT OFFICE.

PAUL J. DEVAN, OF WINDBER, PENNSYLVANIA.

SCREW JACK.

Application filed May 16, 1921. Serial No. 469,923.

*To all whom it may concern:*

Be it known that I, PAUL J. DEVAN, a citizen of the United States, residing at Windber, in the county of Somerset and State of Pennsylvania, have invented certain new and useful Improvements in Screw Jacks, of which the following is a specification.

This invention relates to hoisting jacks of the screw operated class, and has for one of its objects to simplify the construction and increase the efficiency and utility of devices of this character.

Another object of the invention is to produce a device of this character comprising a hollow base and a plurality of threaded tubular members telescopically arranged for disposal within the base and extensible within the range of the threads of the members.

With these and other objects in view, the invention consists of certain novel features of construction as hereinafter shown and described and then specifically pointed out in the claim, and in the drawings illustrative of the preferred embodiment of the invention.

Figure 1 is a longitudinal sectional elevation with the parts distended.

Fig. 2 is a side elevation with the extensible portions withdrawn.

Fig. 3 is a plan view of the device with the parts arranged as in Fig. 2.

The improved device comprises a base or bearing member 10 of a sufficient size to provide an effectual support for the device and to prevent its being easily overturned.

Supported upon the base 10, for instance by clamp screws 11, is a stationary lower member 12 having a cylindrical longitudinal bore 13.

At its upper end the member 12 is laterally enlarged as shown at 14 with annular seats 15 and 16 in the enlarged portion, the seat 16 being smaller in diameter than the seat 15 and communicating with the bore 13 of the member 12. An annular race way 17 is formed in the upper face of the smaller seat 16 to receive antifriction bearing balls 18, as shown.

Mounted for rotation within the seats 15 and 16 is a ring bevel gear 19, internally threaded, and with an annular race way 20 to receive the balls 18.

By this means the ring gear is rotatively mounted in the seats 15 and 16 and supported upon the antifriction balls 18.

Attached to the upper face of the enlargement 14 as by clamp bolts 21, is a holding ring 22 to engage a shoulder in the ring gear 19 and hold the same from upward displacement.

At one side the enlargement 14 is formed with a bearing indicated at 23 to receive a stub shaft 24 having a bevel pinion 25 on its inner end in constant engagement with the ring gear, and a notched wheel or disk 26 at its outer end externally of the bearing 23.

Swinging upon the stub shaft 24 is an operating lever 27 carrying a pawl 28 to engage the teeth of the wheel 26.

By this means the shaft 24 may be intermittently rotated to impart motion to the pinion 22 and thence to the ring gear 19.

Associated with the member 12 are a plurality of threaded tubular members telescopically arranged, the lower tubular member being indicated at 29, is externally threaded as shown at 30 to engage the threads of the ring gear 19, and with an unthreaded lower portion 31 operating within the bore 13 of the member 12 and below the line of the ring gear.

By this means the rotation of the ring gear 19 by the operation of lever 27 will correspondingly elevate or depress the tubular member 29, but the latter cannot be removed upwardly from the member 12 by reason of the unthreaded portion 31 of the member 29.

At its upper part the tubular member 29 is internally threaded for a limited distance as shown at 32 to receive the external threads 33 of the next tubular member 34.

The threads 33 of the member 34 do not extend the full length leaving a limited unthreaded portion 35 so that the member 34 cannot be removed upwardly from the member 29.

At its upper part the tubular member 34 is internally threaded for a limited distance as shown at 36 to receive the external threads $36^1$ of the next tubular member 37.

The threads $36^1$ of the member 37 do not extend the full length leaving a limited unthreaded portion 38, so that the member 37 cannot be moved upwardly from the member 34.

At its upper part the tubular member 37 is internally threaded for a limited distance as shown at $36^2$ to receive the external threads 40 of the final or upper member $40^1$ the member $40^1$ being preferably solid and provided with a bearing plate 41 at the upper end, the latter being roughened to cause it to firmly "grip" the structure being lifted.

The threads 40 of the member 40 do not extend the full length leaving a limited unthreaded portion 42, so that the member 40 cannot be moved upwardly from the member 34.

The improved device is simple in construction, can be inexpensively manufactured and in any size or of any capacity.

The preferred embodiment of the invention is disclosed in the drawings and set forth in the specification, but it will be understood that any modifications within the scope of the claimed invention may be made in the construction without departing from the principle of the invention or sacrificing any of its advantages.

What I claim is:—

A hoisting jack comprising a hollow base member having an annular seat in its upper end and communicating with the interior of the base and provided with a laterally extending bearing, an externally threaded stock, an annular member having an external gear rack and internally threaded to engage the stock and mounted for rotation in said seat, said annular member having an annular outwardly opening seat in its upper face, a shaft mounted in said laterally directed bearing, a gear member carried by said shaft and engaging said gear rack, means for forcibly rotating said shaft to communicate motion to said annular member, and an annular holding ring attached to said base and engaging in the seat of said annular gear.

In testimony whereof, I affix my signature hereto.

PAUL J. DEVAN.